US009807270B2

(12) United States Patent
Takahashi

(10) Patent No.: US 9,807,270 B2
(45) Date of Patent: Oct. 31, 2017

(54) IMAGE READING APPARATUS AND IMAGE FORMING APPARATUS

(71) Applicant: FUJI XEROX CO., LTD., Tokyo (JP)

(72) Inventor: Kaoru Takahashi, Yokohama (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/217,231

(22) Filed: Jul. 22, 2016

(65) Prior Publication Data

US 2017/0264772 A1 Sep. 14, 2017

(30) Foreign Application Priority Data

Mar. 14, 2016 (JP) ................................ 2016-049762

(51) Int. Cl.
*H04N 1/04* (2006.01)
*H04N 1/10* (2006.01)
*H04N 1/00* (2006.01)

(52) U.S. Cl.
CPC ......... *H04N 1/1065* (2013.01); *H04N 1/0057* (2013.01); *H04N 1/00602* (2013.01); *H04N 2201/0081* (2013.01)

(58) Field of Classification Search
CPC ......... H04N 1/1013; H04N 2201/0081; H04N 1/1017; H04N 1/12; H04N 1/121; H04N 1/1215; H04N 1/00559; H04N 2201/0094; H04N 1/00588; H04N 1/00063; H04N 1/00602; H04N 2201/044
USPC ....... 358/474, 498, 497, 496, 488, 406, 448, 358/486; 399/367, 125, 374, 107, 110, 399/124, 168, 365, 371, 372, 373, 379, 399/380, 407; 271/10.01, 162, 227, 264, 271/3.14
See application file for complete search history.

(56) References Cited

U.S. PATENT DOCUMENTS 7,969,623 B2 * 6/2011 Kagami ............... H04N 1/0057 358/474
2004/0008386 A1 * 1/2004 Shiraishi ............... H04N 1/121 358/474
2006/0071586 A1 * 4/2006 Perlo ..................... B82Y 10/00 313/316
2009/0225377 A1 * 9/2009 Yokota ............... H04N 1/00578 358/498

(Continued)

FOREIGN PATENT DOCUMENTS

JP 2008-219533 A 9/2008

*Primary Examiner* — Negussie Worku
(74) *Attorney, Agent, or Firm* — Oliff PLC

(57) ABSTRACT

An image reading apparatus includes a first transparent plate that supports an original document, a second transparent plate that is disposed adjacent to the first transparent plate, a reading member that moves along the first transparent plate to read an image of the original document supported by the first transparent plate and is disposed on a lower side of the second transparent plate, a positioning member that positions the reading member with respect to the second transparent plate in a plate thickness direction of the second transparent plate in a state where the reading member is disposed on the lower side of the second transparent plate, and a transporting member that transports an image of an original document to be read by the reading member positioned with respect to the second transparent plate by the first positioning member, in a linear shape along the second transparent plate.

6 Claims, 11 Drawing Sheets

(56) References Cited

U.S. PATENT DOCUMENTS

| | | | | |
|---|---|---|---|---|
| 2009/0244650 | A1* | 10/2009 | Matsuo | G03G 15/602<br>358/474 |
| 2009/0284808 | A1* | 11/2009 | Hamada | H04N 1/00546<br>358/474 |
| 2011/0013231 | A1* | 1/2011 | Hagio | H04N 1/00013<br>358/443 |
| 2016/0127587 | A1* | 5/2016 | Kim | H04N 1/00557<br>358/474 |
| 2016/0142561 | A1* | 5/2016 | Kim | H04N 1/1013<br>358/406 |
| 2017/0019555 | A1* | 1/2017 | Kim | H04N 1/193 |

* cited by examiner

IMAGE READING APPARATUS AND IMAGE FORMING APPARATUS

CROSS-REFERENCE TO RELATED APPLICATIONS

This application is based on and claims priority under 35 USC 119 from Japanese Patent Application No. 2016-049762 filed on Mar. 14, 2016.

BACKGROUND

Technical Field

The present invention relates to an image reading apparatus and an image forming apparatus.

SUMMARY

According to an aspect of the invention, there is provided an image reading apparatus including: a first transparent plate that supports an original document; a second transparent plate that is disposed adjacent to the first transparent plate such that at least a portion of the second transparent plate on a first transparent plate side is disposed on an upper side of the first transparent plate; a reading member that moves along a plate surface of the first transparent plate to read an image of the original document supported by the first transparent plate and is disposed on a lower side of the second transparent plate; a first positioning member that positions the reading member with respect to the second transparent plate in a plate thickness direction of the second transparent plate in a state where the reading member is disposed on the lower side of the second transparent plate; and a transporting member that transports an image of an original document to be read by the reading member that is positioned with respect to the second transparent plate by the first positioning member, in a linear shape along the second transparent plate on an upper side of the second transparent plate when seen from an original document width direction of the original document.

BRIEF DESCRIPTION OF THE DRAWINGS

Exemplary embodiments of the present invention will be described in detail based on the following figures, wherein.

DETAILED DESCRIPTION

First Exemplary Embodiment

Figure 1:
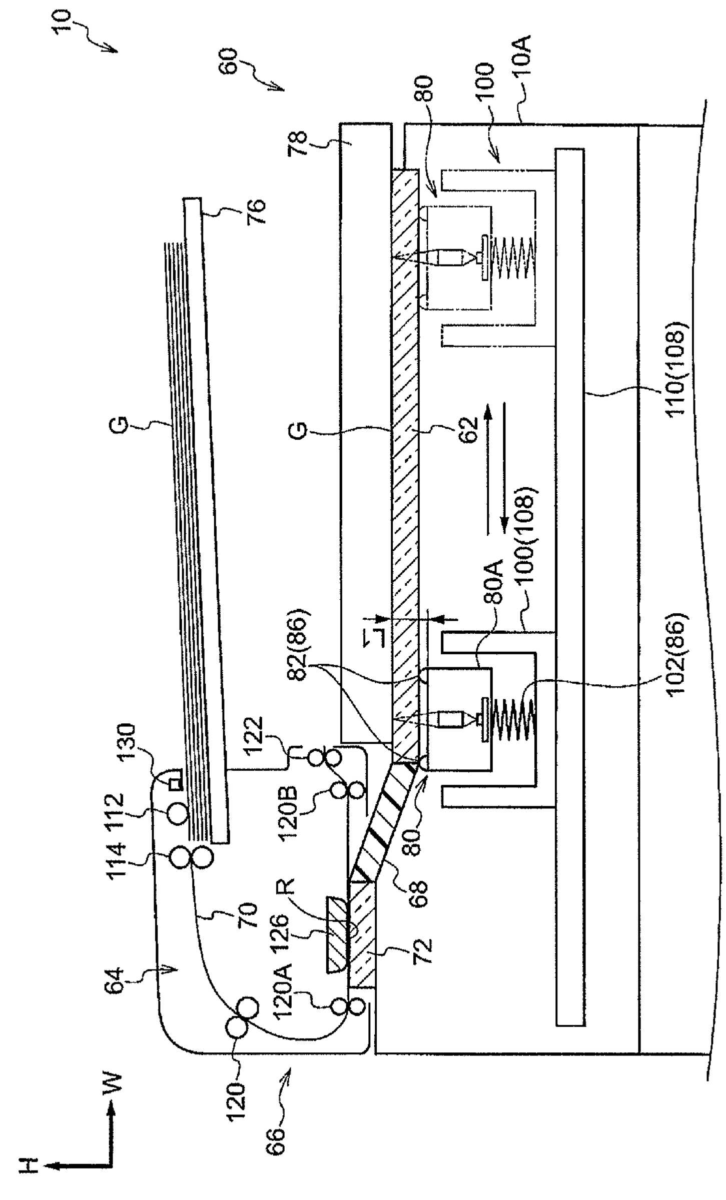
FIG. 1 is a configuration diagram illustrating an image reading apparatus according to a first exemplary embodiment of the invention.

Description will be given of an example of an image reading apparatus and an image forming apparatus according to a first exemplary embodiment of the invention with reference to FIGS. 1 to 6. Furthermore, in the drawings, an arrow H represents an apparatus upper-lower direction (vertical direction), an arrow W represents an apparatus width direction (horizontal direction), and an arrow D represents an apparatus depth direction (horizontal direction).

(Entire Configuration)

Figure 6:
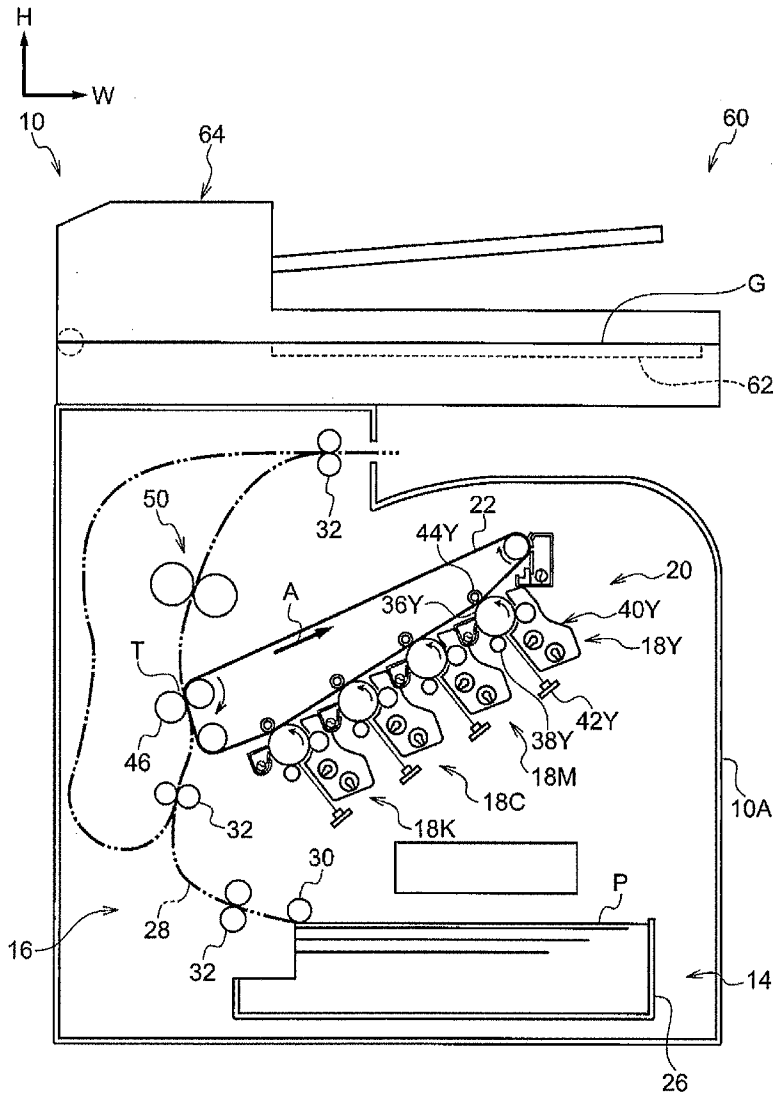
FIG. 6 is a schematic configuration diagram illustrating the image forming apparatus according to the first exemplary embodiment of the invention.

As illustrated in FIG. 6, an image forming apparatus 10 according to this exemplary embodiment includes, in the following order from a lower side to an upper side in the upper-lower direction (arrow H direction), an accommodating unit 14 in which a sheet member P as a recording medium is accommodated, a transporting unit 16 that transports the sheet member P that is accommodated in the accommodating unit 14, an image forming unit 20 that forms an image on the sheet member P that is transported from the accommodating unit 14 to the transporting unit 16, and an image reading unit 60 (an example of an image reading apparatus) that reads an image that is formed on an original document G.

[Accommodating Unit]

The accommodating unit 14 includes an accommodating member 26 that is drawable to a front side in the apparatus depth direction from an apparatus main body 10A of the image forming apparatus 10, and the sheet member P is loaded in the accommodating member 26. The accommodating unit 14 includes a feed roller 30 that feeds the sheet member P, which is loaded in the accommodating member 26, to a transporting path 28 that constitutes the transporting unit 16.

[Transporting Unit]

The transporting unit 16 includes plural transporting rollers 32 which transport the sheet member P along the transporting path 28.

[Image Forming Unit]

The image forming unit 20 includes four image forming units 18Y, 18M, 18C, and 18K of yellow (Y), magenta (M), cyan (C), and black (K), respectively. In the following description, Y, M, C, and K may be omitted in a case where it is not necessary to discriminate Y, M, C, and K.

The image forming unit 18 of each color is detachable from the apparatus main body 10A. The image forming unit 18 of each color includes an image holding member 36, a charging roller 38 that charges a surface of the image holding member 36, and an exposure device 42 that irradiates the image holding member 36, which is charged, with exposure light. The image forming unit 18 of each color includes a developing device 40 that develops an electrostatic latent image, which is formed by exposing the charged image holding member 36 in the exposure device 42, to visualize the electrostatic latent image as a toner image.

The image forming unit 20 includes an endless transfer belt 22 that circulates in the arrow A direction in the drawing, and a primary transfer roller 44 that transfers a toner image, which is formed by the image forming unit 18 of each color, to the transfer belt 22. The image forming unit 20 includes a secondary transfer roller 46 that transfers the toner image, which is transferred to the transfer belt 22, to the sheet member P, and a fixing device 50 that heats and compresses the sheet member P, to which the toner image is transferred, to fix the toner image onto the sheet member P.

[Image Reading Unit]

The image reading unit 60 includes a first transparent plate 62 that supports the original document G when reading an image of one sheet of the original document G. Details of the image reading unit 60 will be described later. (Operation of Image Forming Apparatus)

In the image forming apparatus 10, an image is formed as follows.

First, the charging roller 38 of each color, to which a voltage is applied, negatively charges a surface of the image holding member 36 of each color with a predetermined potential in a uniform manner. Subsequently, the exposure device 42 irradiates the charged surface of the image holding member 36 of each color with exposure light on the basis of data that is read by the image reading unit 60 so as to form an electrostatic latent image.

Accordingly, the electrostatic latent image, which corresponds to the data, is formed on the surface of the image holding member 36 of each color. The developing device 40 of each color develops the electrostatic latent image to visualize the electrostatic latent image as a toner image. The toner image, which is formed on the surface of the image holding member 36 of each color, is transferred to the transfer belt 22 by the primary transfer roller 44.

Accordingly, the sheet member P, which is fed from the accommodating member 26 to a transporting path 28 by the feed roller 30, is transported to a transfer position T at which the transfer belt 22 and the secondary transfer roller 46 come into contact with each other. At the transfer position T, the sheet member P is transported between the transfer belt 22 and the secondary transfer roller 46, and thus the toner image on the surface of the transfer belt 22 is transferred to the sheet member P.

The toner image, which is transferred to the sheet member P, is fixed to the sheet member P by the fixing device 50. The sheet member P, to which the toner image is fixed, is discharged to an outer side of the apparatus main body 10A by the transporting rollers 32.

(Configuration of Main Portion)

Next, description will be given of the image reading unit 60.

As illustrated in FIG. 1, the image reading unit 60 includes the first transparent plate 62 that supports the original document G when reading an image of one sheet of the original document G.

The first transparent plate 62 (so-called platen glass) is inserted into an upper portion of the apparatus main body 10A. An opening/closing cover 66, which opens or closes the first transparent plate 62, is disposed on an upper side of the first transparent plate 62. A transporting device 64 (so-called ADF device; an example of a transporting member) which transports each of plural sheets of the original documents G along a transporting path 70 on an inner side of the opening/closing cover 66, and causes the original documents D to pass through an original document reading position R on an upper side of a second transparent plate 72 that is disposed adjacent to the first transparent plate 62, is disposed on an inner side of the opening/closing cover 66.

A reading unit 80 (an example of a reading member) which reads an image of the original document G that is loaded on the first transparent plate 62, and an image of the original document G that is transported to the original document reading position R by the transporting device 64, is disposed on an inner side of the apparatus main body 10A. A guiding device 108 that guides the reading unit 80 in the apparatus width direction, a positioning member 86 (an example of a first positioning member) that positions the reading unit 80 with respect to the first transparent plate 62 or the second transparent plate 72, and a driving source (not illustrated) that moves the reading unit 80 by the guiding device 108 are disposed on the inner side of the apparatus main body 10A.

]First Transparent Plate and Second Transparent Plate]

The thickness of the first transparent plate 62 and the thickness of the second transparent plate 72 are set to be equal to each other, and a plate surface of the first transparent plate 62 and a plate surface of the second transparent plate 72 face the upper-lower directions. The first transparent plate 62 has a rectangular shape that extends in the apparatus width direction when seen from above. The second transparent plate 72 has a rectangular shape that extends in the apparatus depth direction when seen from above, and is disposed adjacent to one side (the left side in the drawing) in the apparatus width direction with respect to the first transparent plate 62, and on an upper side with respect to the first transparent plate 62 as illustrated in FIG. 1.

A connecting plate 68, which is formed from a resin, is disposed between the first transparent plate 62 and the second transparent plate 72, specifically, between an end face of the first transparent plate 62 and an end face of the second transparent plate 72 in an inclined manner when seen from the apparatus depth direction.

[Opening/Closing Cover]

Figure 5B:
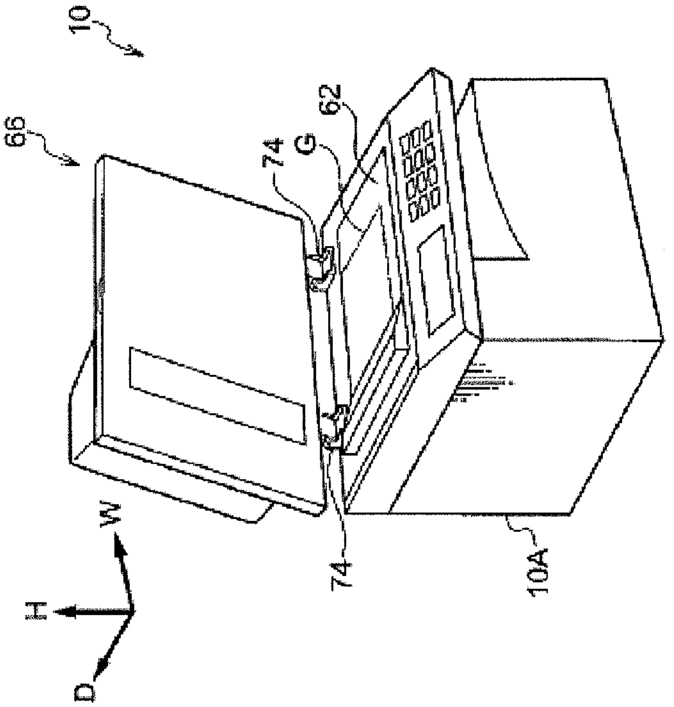
FIGS. 5A and 5B are perspective views illustrating an image forming apparatus according to the first exemplary embodiment of the invention.
Figure 5A:
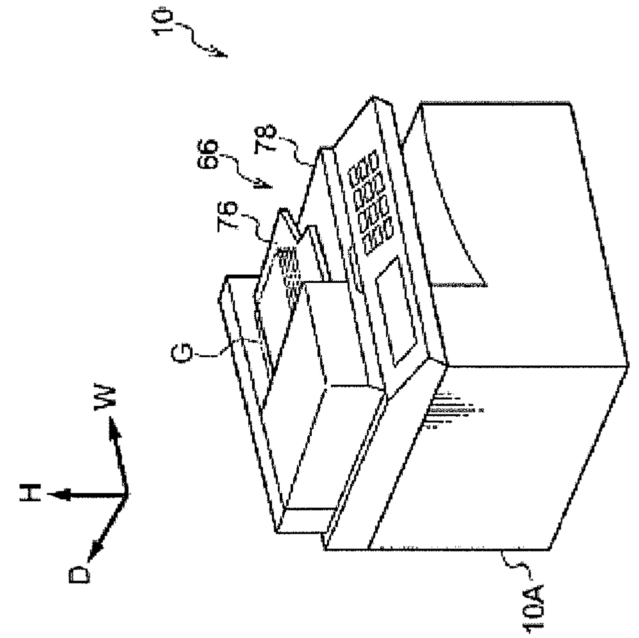

As illustrated in FIGS. 5A and 5B, the opening/closing cover 66 is mounted to an upper portion of the apparatus main body 10A through two hinges 74 so as to open and close the first transparent plate 62 and the second transparent plate 72.

The opening/closing cover 66 includes an original document tray 76 on which the plural original documents G to be transported by the transporting device 64 (refer to FIG. 1) are loaded, and a discharge tray 78, to which each of the original documents G which are transmitted by the transporting device 64, is discharged.

In a state (refer to FIG. 5B: an opened state) where the first transparent plate 62 is opened by opening the opening/closing cover 66, the original document G is loaded on the first transparent plate 62, and the first transparent plate 62 supports the original document G. In contrast, in a state (refer to FIG. 5A: a closed state) where the first transparent plate 62 is closed by closing the opening/closing cover 66, the opening/closing cover 66 presses the original document G, which is loaded on the first transparent plate 62, to the first transparent plate 62.

[Reading Unit]

Figure 4:
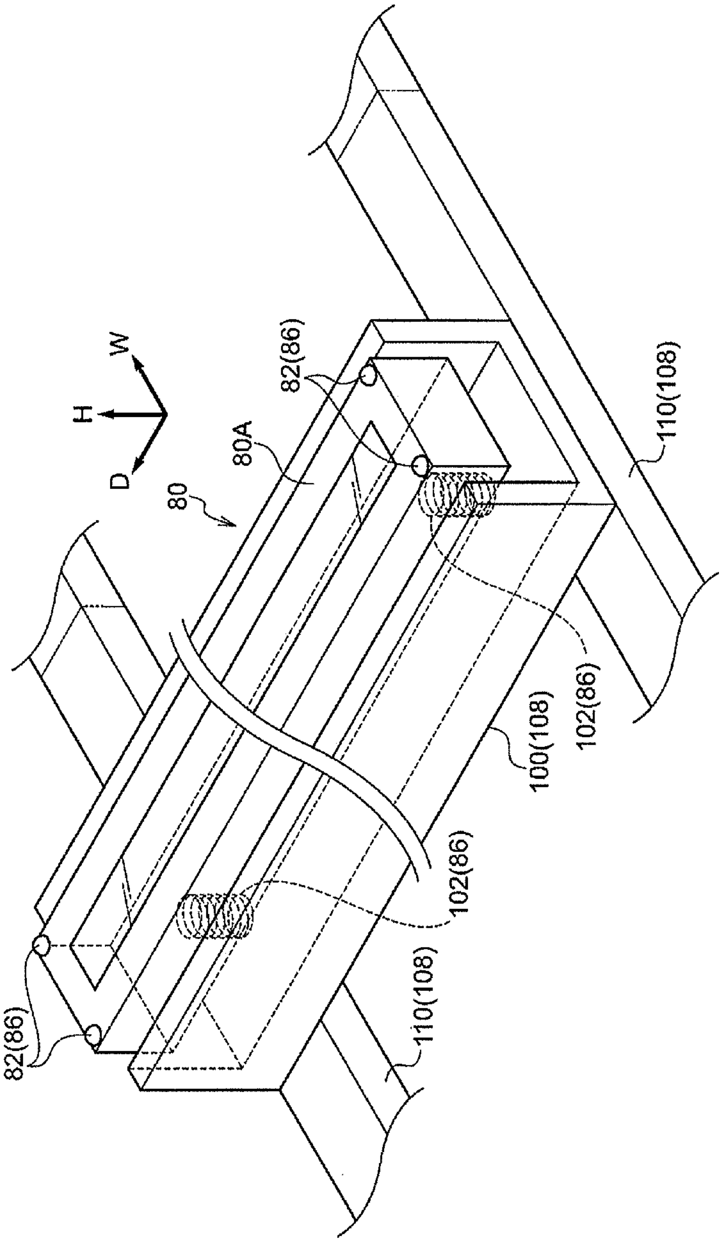
FIG. 4 is a perspective view illustrating a reading unit which is provided to the image reading apparatus according to the first exemplary embodiment of the invention.

The reading unit 80 reads an image with a known Contact Image Sensor (CIS) in which a lens array and the like are disposed on an inner side. As illustrated in FIG. 4, the reading unit 80 includes a casing 80A having a rectangular parallelepiped shape that extends in the apparatus depth direction.

[Guiding Device and Positioning Member]

The guiding device 108 includes a supporting member 100 that supports the reading unit 80 through a coil spring 102 (described later), and a pair of rail members 110 which supports the supporting member 100 in a movable manner in the apparatus width direction.

As illustrated in FIG. 4, the supporting member 100 has a U-shape of which an upper side is opened, and a part of the casing 80A is disposed on an inner side of the supporting member 100. A pair of coil springs 102, which biases the casing 80A to an upper side, is disposed in parallel in the apparatus depth direction between a bottom plate of the supporting member 100 and a bottom plate of the casing 80A. The supporting member 100 supports the casing 80A by a guiding member (not illustrated) in order for the casing 80A to move in the upper-lower direction.

The pair of rail members 110 is disposed on both sides of the supporting member 100 in the apparatus depth direction, and extends in the apparatus width direction.

A pair of protrusions 82, which protrude to an upper side, is respectively formed in parallel in the apparatus width direction at portions on both end sides of the casing 80A in the apparatus depth direction. The protrusions 82 and the coil springs 102 constitute the positioning member 86 that positions the reading unit 80 with respect to the first transparent plate 62 or the second transparent plate 72.

Figure 3:
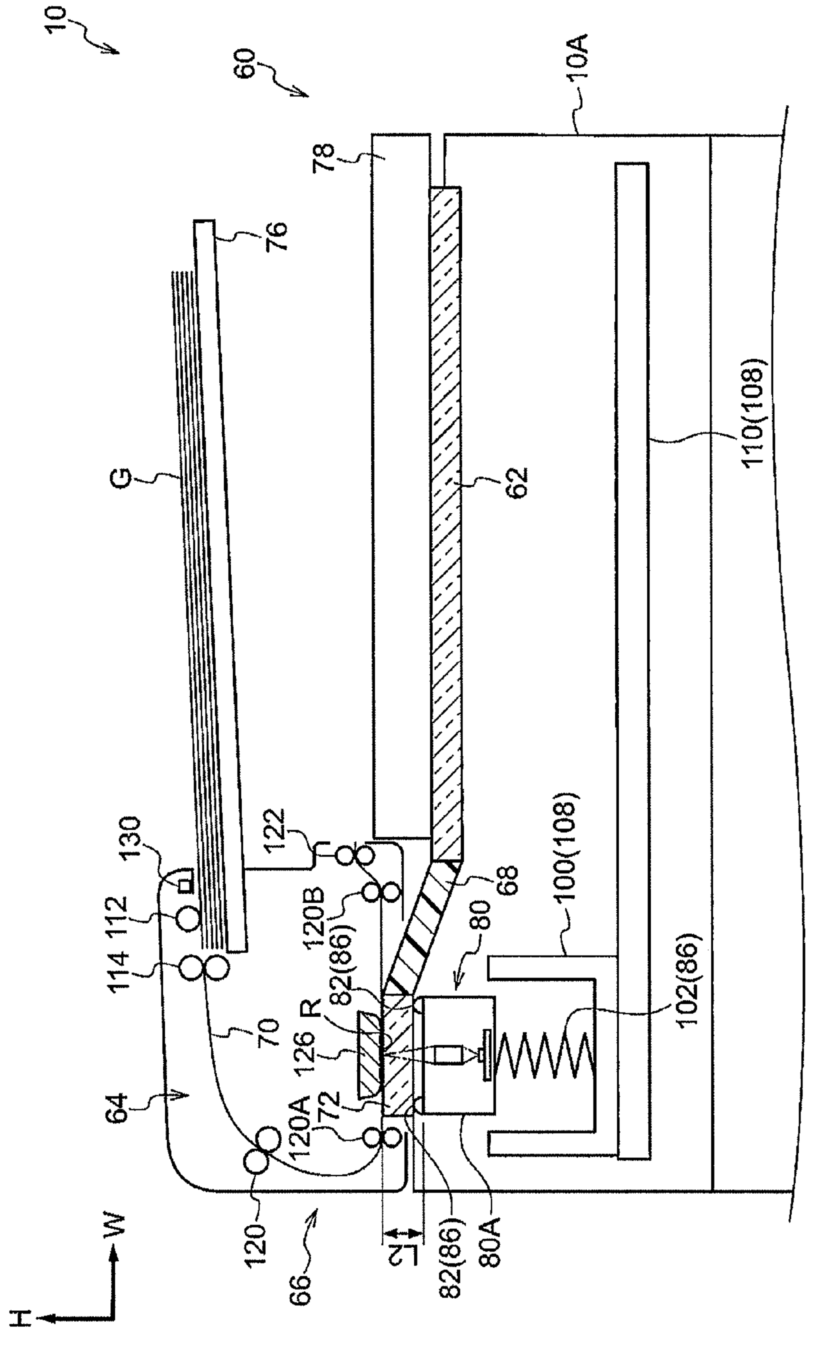
FIG. 3 is a configuration diagram illustrating the image reading apparatus according to the first exemplary embodiment of the invention.

In this configuration, as illustrated in FIGS. 1 and 3, the casing 80A of the reading unit 80, which moves in the apparatus width direction, is biased by the coil springs 102 in order for the protrusions 82 to come into contact with a lower surface of the first transparent plate 62 or a lower surface of the second transparent plate 72. Accordingly, the reading unit 80 is positioned in the upper-lower direction with respect to the first transparent plate 62 or the second transparent plate 72. The movement of the reading unit 80 will be described in combination with the following operation.

[Transporting Device]

As illustrated in FIG. 1, the transporting device 64 includes a feed roller 112 that feeds each of the plural sheets of original documents G, which are loaded on the original document tray 76, to the transporting path 70 of the original document G, and a separation roller 114 that transports the original documents G, which are fed by the feed roller 112, sheet by sheet.

The transporting device 64 includes plural transporting rollers 120 which transport the original document G that is separated by the separation roller 114 in order for the original document G to pass through the original document reading position R on an upper side of the second transparent plate 72, and a discharge roller 122 that discharges the original document G, which is transported by the transporting rollers 120, to the discharge tray 78 that is disposed on a lower side of the original document tray 76.

Here, a transporting roller 120A (an example of a first transporting roller) is disposed upstream of the original document reading position R in a transporting direction of the original document G. A transporting roller 120B (an example of a second transporting roller) is disposed downstream of the original document reading position R in the transporting direction of the original document G. The transporting roller 120A and the transporting roller 120B are disposed at the same height in the upper-lower direction. That is, a nip position of the transporting roller 120A and a nip position of the transporting roller 120B are set to the same position in the upper-lower direction. At least a part of the transporting roller 120B is disposed on a lower side of an upper surface of the second transparent plate 72 and on an upper side of an upper surface of the first transparent plate 62.

The transporting device 64 includes a supporting member 126 which is disposed on a side opposite to the second transparent plate 72 with respect to the transporting path 70 of the original document G between the transporting roller 120A and the transporting roller 120B, and which supports the original document G that is transported. The transporting device 64 includes a sensor 130 that detects whether the original document G is loaded on the original document tray 76.

In this configuration, the original document G, which is transported between the transporting roller 120A and the transporting roller 120B, is set to a linear shape when seen from the apparatus depth direction (an original document width direction of the original document G), and is set to be transported along the upper surface of the second transparent plate 72. In other words, the transporting path 70 of the original document G between the transporting roller 120A and the transporting roller 120B is set to a linear shape along the upper surface of the second transparent plate 72. That is, when seen from the apparatus depth direction, a straight line, which connects the nip position of the transporting roller 120A and the nip position of the transporting roller 120B, is set to a linear shape along the upper surface of the second transparent plate 72.

(Operation of Configuration of Main Portion)

Next, description will be given of an operation of the image reading unit 60.

The reading unit 80 of the image reading unit 60 can read an image of the original document G that is supported by the first transparent plate 62, and an image of the original document G that is transported by the transporting device 64. In a state where a power supply of the image forming apparatus 10 is turned off, the reading unit 80 is disposed at a reading start position at which reading of the image of the original document G supported by the first transparent plate 62 is started (position indicated by a solid line in FIG. 1).

First, description will be given of a case where the reading unit 80 reads an image of the original document G loaded on the first transparent plate 62 with reference to FIG. 1.

In a case where a user turns on a power supply of the image forming apparatus 10 and presses an image reading start button (not illustrated), and the sensor 130 does not detect the original document G on the original document tray 76, reading of the image of the original document G, which is supported by the first transparent plate 62, is started by the reading unit 80.

Specifically, the reading unit 80, which is disposed at the reading start position, moves in the apparatus width direction toward a reading end position (two-dot chain line in the drawing) along the first transparent plate 62 by a driving force of a driving source (not illustrated) while reading the image of the original document G. Here, the casing 80A is biased by the coil spring 102 such that the protrusions 82, which are formed on the casing 80A, come into contact with the lower surface of the first transparent plate 62. Therefore, the reading unit 80 moves in the apparatus width direction in a state where the protrusions 82 come into contact with the lower surface of the first transparent plate 62. Accordingly, the reading unit 80 moves from the reading start position to the reading end position in a state where an optical distance L1 (refer to the drawing) between the original document G supported by the first transparent plate 62 and the reading unit 80 is maintained to the same value.

The reading unit 80, which reads the image of the original document G and moves to the reading end position, moves to the reading start position and waits until a next reading instruction is given.

Figure 2:
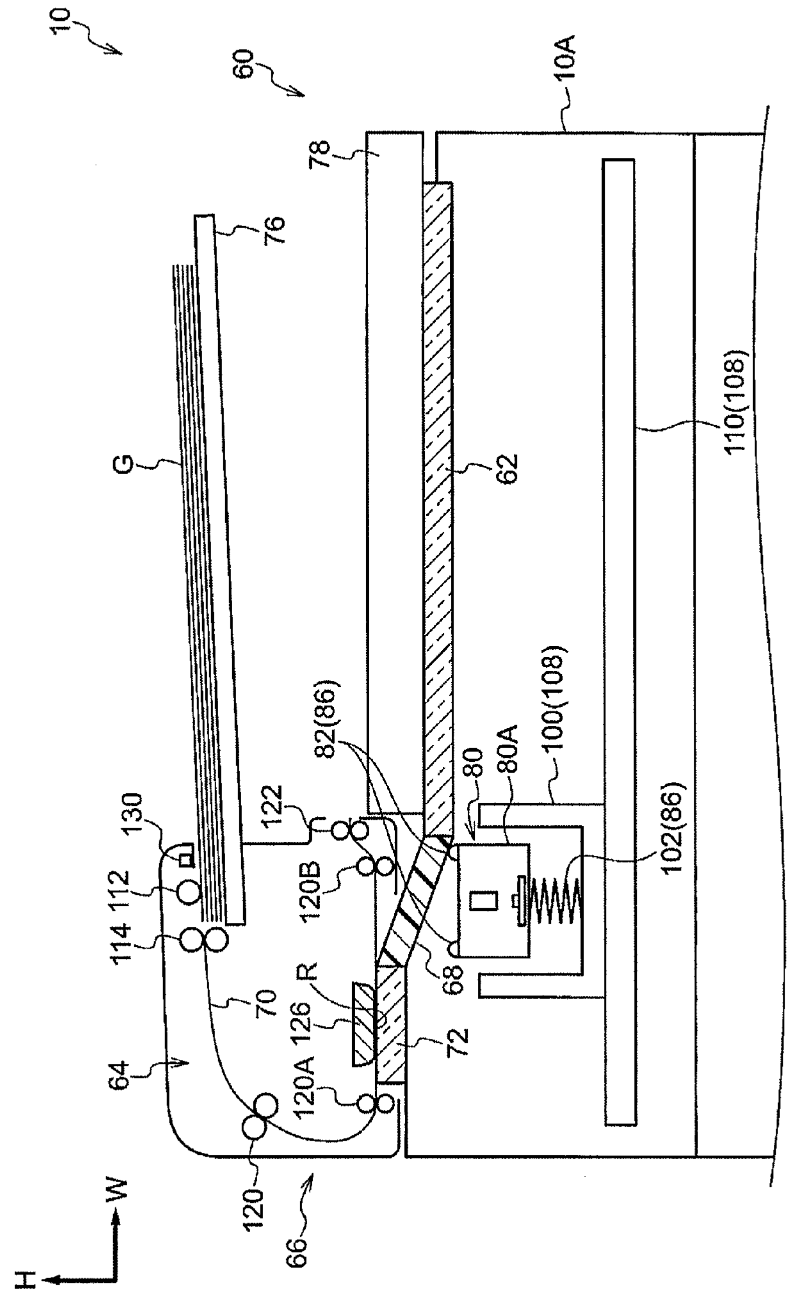
FIG. 2 is a configuration diagram illustrating the image reading apparatus according to the first exemplary embodiment of the invention.

Next, description will be given of a case where the reading unit 80 reads an image of an original document G that is transported by the transporting device 64 with reference to FIGS. 2 and 3.

In a case where a user turns on the power supply of the image forming apparatus 10 and presses the image reading start button (not illustrated), and the sensor 130 detects the original document G on the original document tray 76, reading of the image of the original document G, which is transported, is started by the reading unit 80.

Specifically, the reading unit 80, which is disposed at the reading start position, moves in the apparatus width direction by the driving force of the driving source (not illustrated) so as to be disposed on a lower side of the second transparent plate 72. Here, the supporting member 100 supports the casing 80A such that the casing 80A moves in the upper-lower direction without being inclined. The casing 80A is biased by the coil spring 102 such that the protrusions 82, which are formed on the casing 80A, come into contact with the lower surface of the second transparent plate 72. Accordingly, the reading unit 80 moves in the apparatus width direction in a state where the protrusions 82 come into contact with a lower surface of the connecting plate 68 that is inclined when seen from the apparatus depth direction. Along with the movement of the reading unit 80 in the apparatus width direction, the reading unit 80 also moves in the upper-lower direction.

When the reading unit 80 reaches a lower side of the second transparent plate 72, the reading unit 80 stops at a transportation reading position (refer to FIG. 3) that faces the original document reading position R. In this state, the protrusions 82 come into contact with the lower surface of the second transparent plate 72. An optical distance L2 (refer to FIG. 3) between the original document G that is transported along the second transparent plate 72 and the reading unit 80 becomes the same value as the optical distance L1 (refer to FIG. 1).

When the reading unit 80 stops at the transportation reading position, the feed roller 112 feeds each of the plural sheets of original documents G, which are loaded on the original document tray 76, to the transporting path 70. The separation roller 114 separates the original documents G, which are fed to the transporting path 70, sheet by sheet. The transporting rollers 120 transport the original document G toward the original document reading position R, and the reading unit 80 reads an image of the original document G that passes through the original document reading position R. The discharge roller 122 sequentially discharges the original document G, which passes through the original document reading position R, to the discharge tray 78.

Here, the original document G, which is transported between the transporting roller 120A and the transporting roller 120B, is transported in a linear shape along the upper surface of the second transparent plate 72 when seen from the apparatus depth direction (original document width direction), and passes through the original document reading position R. The reading unit 80 reads the image of the original document G that is transported in the linear shape as described above.

When reading of the image of the original document G, which is transported, ends, the reading unit 80 moves to the reading start position (solid line in FIG. 1) and waits until a next reading instruction is given.

(Summary of Configuration of Main Portion)

As described above, the reading unit 80 reads the image of the original document G that is transported in a linear shape by the transporting rollers 120A and 120B. Therefore, quality of the read image is improved in comparison to a case where the original document G is transported while being bent in a curved shape on an upper side of the second transparent plate 72 (reproducibility of the image of the original document G is improved).

In addition, at least a part of the transporting roller 120B, which is disposed downstream of the original document reading position R in the transporting direction of the original document G, is disposed on a lower side of the upper surface of the second transparent plate 72. Therefore, the original document G is transported in a linear shape along the second transparent plate 72 with a simple configuration, in which the second transparent plate 72 is not inclined with respect to the first transparent plate 62, in comparison to a case where the entirety of the transporting roller 120B is disposed in an upper side of the second transparent plate 72.

Further, in the image forming apparatus 10, since quality of the image read by the reading unit 80 is improved, quality of an output image is improved in comparison to a case where the image reading unit 60 is not provided.

Second Exemplary Embodiment

Figure 7:
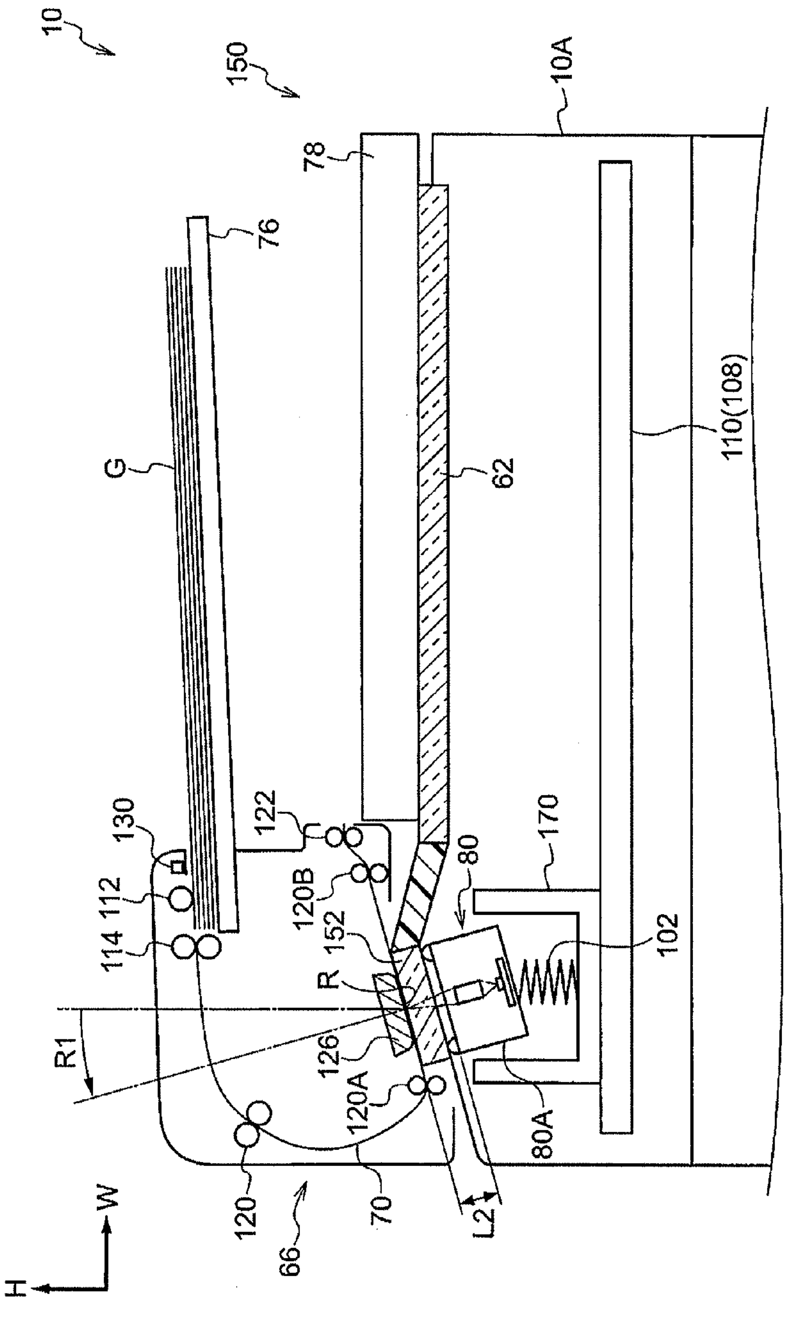
FIG. 7 is a configuration diagram illustrating an image reading apparatus according to a second exemplary embodiment of the invention.

Next, description will be given of an example of an image reading unit according to a second exemplary embodiment of the invention with reference to FIG. 7. The same reference numeral will be given to the same element as in the first exemplary embodiment, and description thereof will not be repeated. Description will be mainly given of a portion that is different from the first exemplary embodiment.

A supporting member 170, which is provided to an image reading unit 150 according to the second exemplary embodiment supports the casing 80A by a guiding member (not illustrated) such that the casing 80A can move in the upper-lower direction while being inclined when seen from the apparatus depth direction.

A second transparent plate 152 of the image reading unit 150 is inclined in a counter-clockwise direction when seen in the apparatus depth direction (R1 direction in the drawing). In other words, the second transparent plate 152 is inclined with respect to the first transparent plate 62. A portion of the second transparent plate 152 on a first transparent plate 62 side is disposed on an upper side of the first transparent plate 62.

A transporting roller 140A (an example of a first transporting roller) is disposed upstream of the original document reading position R in a transporting direction of the original document G. A transporting roller 140B (an example of a second transporting roller) is disposed downstream of the original document reading position R in the transporting direction of the original document G.

The transporting roller 140B is disposed on an upper side of the transporting roller 140A and on an upper side of the second transparent plate 72. The original document G, which is transported between the transporting roller 140A and the transporting roller 140B, is set to be transported in a linear shape along an upper surface of the second transparent plate 152 when seen from the apparatus depth direction (original document width direction).

In this configuration, the reading unit 80, which is disposed at the transportation reading position, is inclined along a plate surface of the second transparent plate 152. In this state, the reading unit 80 reads an image of the original document G that is transported in a linear shape by the transporting rollers 140A and 140B.

As described above, the reading unit 80 reads the image of the original document G that is transported in a linear shape by the transporting rollers 140A and 140B. Therefore, quality of the read image is improved in comparison to a case where the original document G is transported while being bent in a curved shape on an upper side of the second transparent plate 152.

The other operations are the same as in the first exemplary embodiment other than the operation obtained by the configuration in which at least a part of the transporting roller 120B, which is disposed downstream of the original document reading position R in the transporting direction of the original document G, is disposed on a lower side of the upper surface of the second transparent plate 152.

Third Exemplary Embodiment

Next, description will be given of an example of an image reading unit according to a third exemplary embodiment of the invention with reference to FIGS. 8A to 11. The same reference numeral will be given to the same member as in the first exemplary embodiment, and description thereof will not be repeated. Description will be mainly given of a portion that is different from the first exemplary embodiment.

Figure 8A:
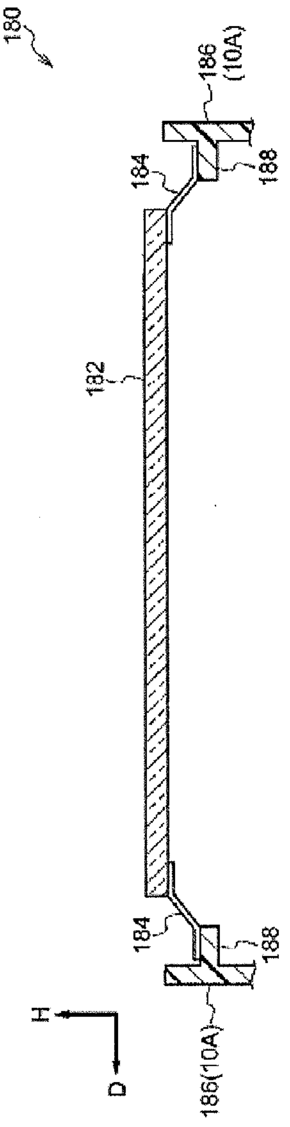
FIGS. 8A and 8B are cross-sectional views illustrating a second transparent plate which is provided to an image reading apparatus according to a third exemplary embodiment of the invention.

A second transparent plate 182, which is provided to an image reading unit 180 according to the third exemplary embodiment, is attached to the apparatus main body 10A through a pair of leaf springs 184 as illustrated in FIG. 8A.

Specifically, a pair of ribs 188 protrudes toward an inner side of an apparatus from a pair of vertical walls 186 which constitute the apparatus main body 10A and are disposed with the second transparent plate 182 interposed therebetween in the apparatus depth direction. A base end of each of the leaf springs 184 is attached to each of the ribs 188, and a tip end of the leaf spring 184 is attached to a lower surface of the second transparent plate 182.

Figure 9:
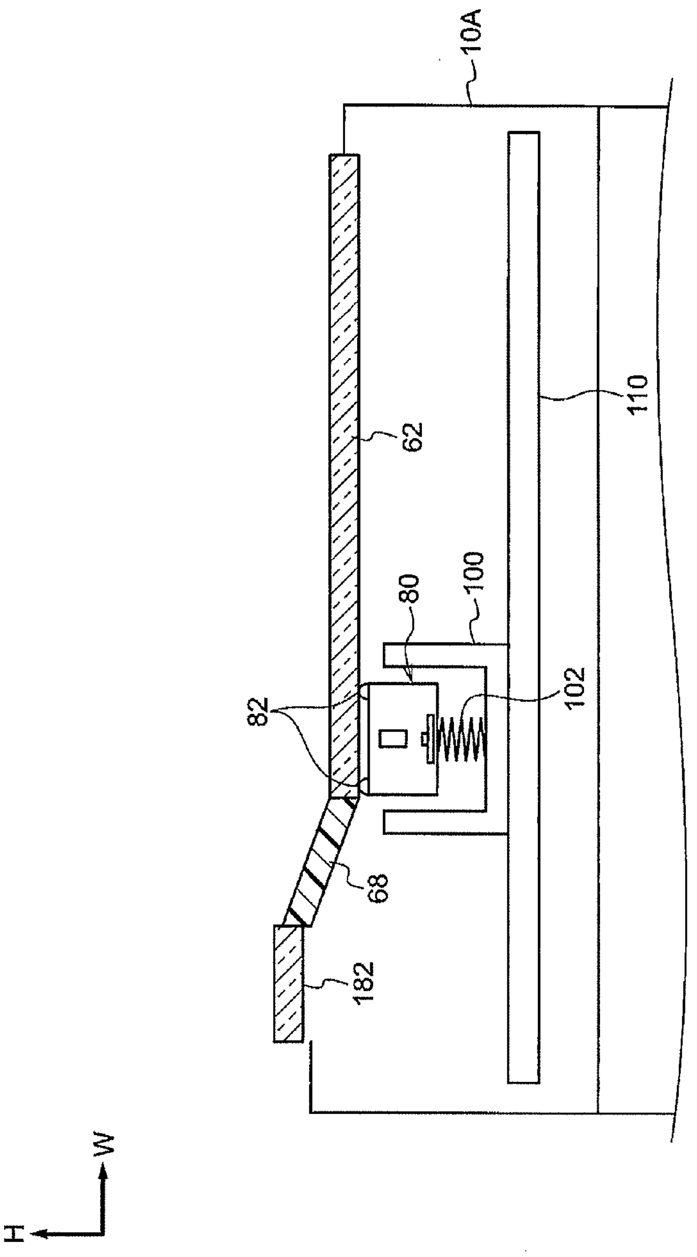
FIG. 9 is a configuration diagram illustrating the image reading apparatus according to the third exemplary embodiment of the invention.
Figure 10:
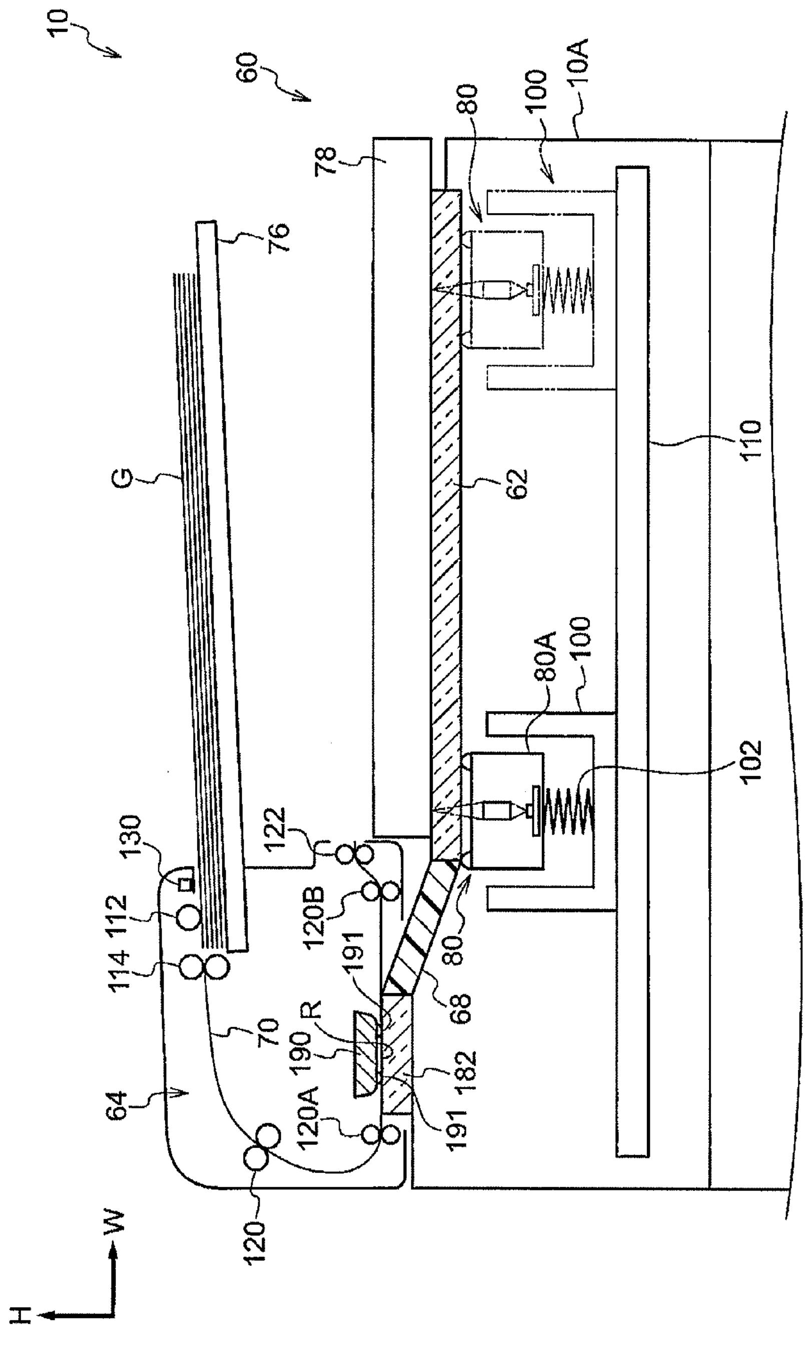
FIG. 10 is a configuration diagram illustrating the image reading apparatus according to the third exemplary embodiment of the invention.

In this configuration, when the leaf spring 184 is elastically deformed by an external force, the second transparent plate 182 can move in a plate thickness direction (in this exemplary embodiment, the apparatus upper-lower direction) of the second transparent plate 182. In a free state (state where a load is not applied to the second transparent plate 182), as illustrated in FIG. 9, the second transparent plate 182 is disposed on an upper side of an end portion of the connecting plate 68 on a second transparent plate 182 side. In other words, in a state where the opening/closing cover 66 is opened (refer to FIG. 5B), the second transparent plate 182 is disposed on an upper side of the end portion of the connecting plate 68 on the second transparent plate 182 side.

Figure 8B:
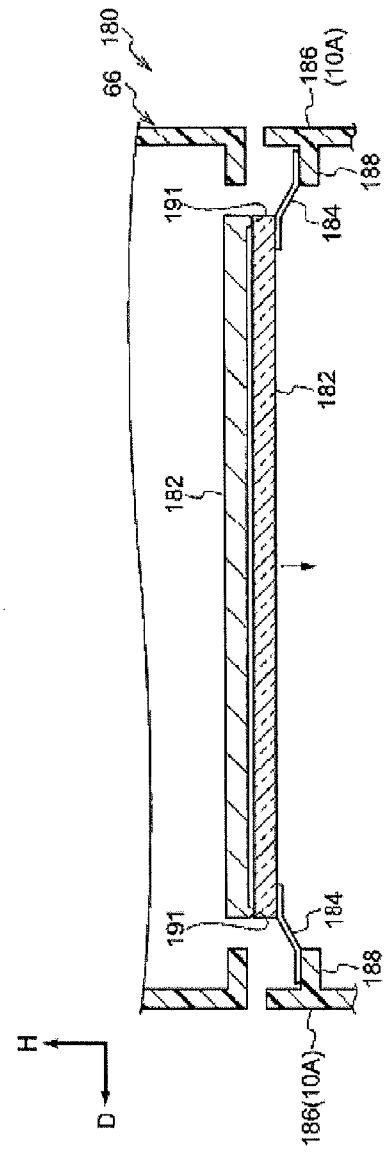

In a state where the opening/closing cover 66 is closed (refer to FIG. 5A), as illustrated in FIG. 8B, a protrusion 191, which protrudes toward the second transparent plate 182 side, is formed at both ends of a supporting member 190 (refer to FIGS. 10 and 11), which is disposed at a side opposite to the second transparent plate 182 with the transporting path 70 of the original document G interposed therebetween, in the apparatus depth direction. The protrusion 191 (an example of a second positioning member) is formed at both ends of the supporting member 190 two in parallel in the apparatus width direction. The supporting member 190 and the transporting device 64 are attached to a frame member (not illustrated), and a relative positional variation between the supporting member 190 and the transporting device 64 is set within the standard that is determined in advance.

In this configuration, when the opening/closing cover 66, which is in an opened state, rotates and is disposed in a closed state, as illustrated in FIG. 8B, the second transparent plate 182 is pressed by the protrusions 191 of the supporting member 190 and moves toward a lower side, and is positioned with respect to the supporting member 190. In other words, the second transparent plate 182 is positioned with respect to the transporting device 64 through the supporting member 190.

Figure 11:
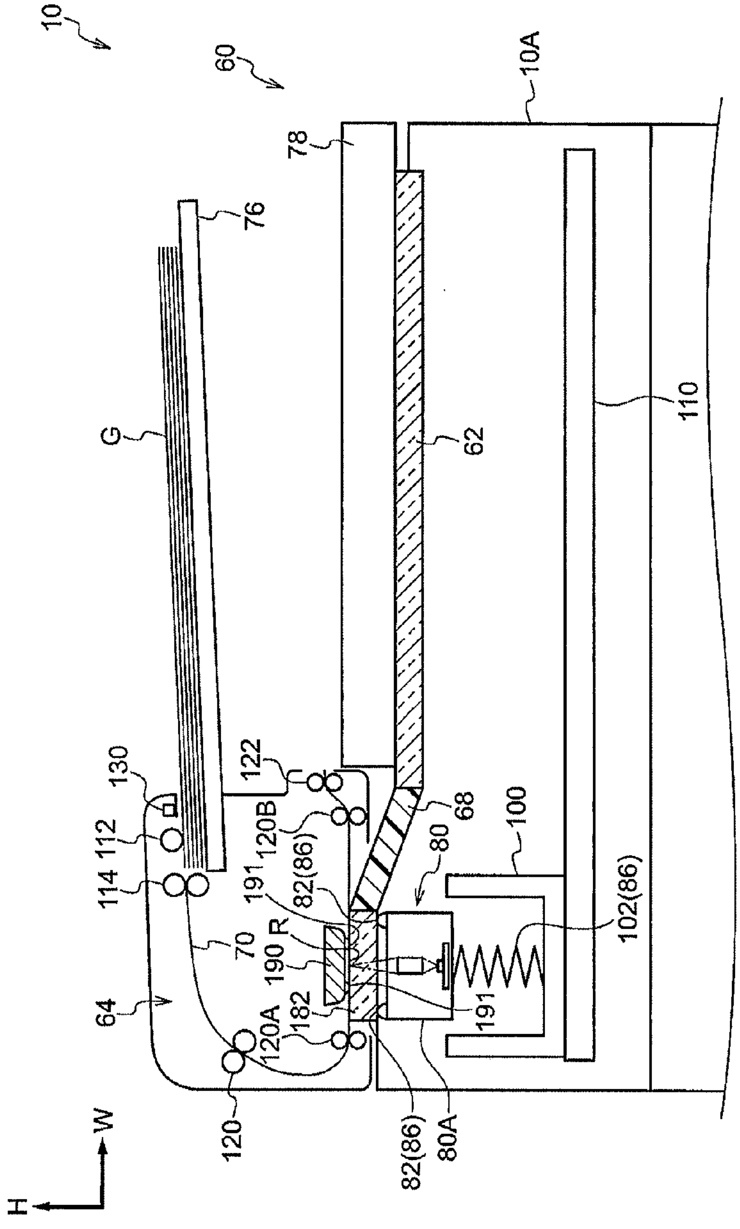
FIG. 11 is a configuration diagram illustrating the image reading apparatus according to the third exemplary embodiment of the invention.

On the other hand, as illustrated in FIG. 11, the reading unit 80, which is disposed at the transportation reading position, is positioned with respect to the second transparent plate 182 by the positioning member 86.

As described above, the reading unit 80, which is disposed at the transportation reading position, is positioned with respect to the transporting device 64 through the second transparent plate 182 and the supporting member 190. Therefore, quality of the read image is improved in comparison to a case where the reading unit 80 is not positioned with respect to the transporting device 64.

The other operations are the same as in the first exemplary embodiment.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

For example, in the exemplary embodiments, the original document G is transported between the transporting roller 120A or 140A, and the transporting roller 120B or 140B so as to transport the original document G in a linear shape. However, the original document G may be transported while being suctioned with a transporting belt and the like so as to transport the original document G in a linear shape.

What is claimed is:

1. An image reading apparatus comprising:

a first transparent plate that supports an original document;

a second transparent plate that is disposed adjacent to the first transparent plate such that at least a portion of the second transparent plate on a first transparent plate side is disposed on an upper side of the first transparent plate;

a reading member that moves along a plate surface of the first transparent plate to read an image of the original document supported by the first transparent plate and is disposed on a lower side of the second transparent plate;

a first positioning member that positions the reading member with respect to the second transparent plate in a plate thickness direction of the second transparent plate in a state where the reading member is disposed on the lower side of the second transparent plate; and a transporting member that transports an image of an original document to be read by the reading member that is positioned with respect to the second transparent plate by the first positioning member, in a linear shape along the second transparent plate on an upper side of the second transparent plate when seen from an original document width direction of the original document.

2. The image reading apparatus according to claim 1, wherein the transporting member comprises:

a first transporting roller that is disposed upstream of the second transparent plate in a transporting direction of the original document; and a second transporting roller that is disposed downstream of the second transparent plate in the transporting direction, and wherein at least a part of the second transporting roller is disposed on a lower side of an upper surface of the second transparent plate.

3. The image reading apparatus according to claim 2, wherein the second transparent plate is supported in a movable manner in the plate thickness direction of the second transparent plate, the image reading apparatus further comprising:

a second positioning member that positions the second transparent plate with respect to the transporting member in the plate thickness direction of the second transparent plate in a state where the reading member reads the image of the original document transported by the transporting member.

4. An image forming apparatus comprising:

the image reading apparatus according to claim 2; and an image forming unit that forms an image on a recording medium based on image data that is read by the image reading apparatus.

5. The image reading apparatus according to claim 1, wherein the second transparent plate is supported in a movable manner in the plate thickness direction of the second transparent plate, the image reading apparatus further comprising:

a second positioning member that positions the second transparent plate with respect to the transporting member in the plate thickness direction of the second transparent plate in a state where the reading member reads the image of the original document transported by the transporting member.

6. An image forming apparatus comprising:

the image reading apparatus according to claim 1; and an image forming unit that forms an image on a recording medium based on image data that is read by the image reading apparatus.

* * * * *